United States Patent
Yokomichi et al.

(10) Patent No.: US 11,060,569 B2
(45) Date of Patent: Jul. 13, 2021

(54) CENTRIFUGAL CLUTCH (71) Applicant: Kabushiki Kaisha F.C.C., Hamamatsu (JP)

(72) Inventors: Yuta Yokomichi, Hamamatsu (JP); Kaoru Aono, Hamamatsu (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 0 days.

(21) Appl. No.: 16/339,660

(22) PCT Filed: Aug. 8, 2017

(86) PCT No.: PCT/JP2017/028742
§ 371 (c)(1),
(2) Date: Apr. 4, 2019

(87) PCT Pub. No.: WO2018/066223
PCT Pub. Date: Apr. 12, 2018

(65) Prior Publication Data
US 2019/0234470 A1 Aug. 1, 2019

(30) Foreign Application Priority Data

Oct. 6, 2016 (JP) .............................. JP2016-198247

(51) Int. Cl.
*F16D 43/14* (2006.01)
*F16D 43/18* (2006.01)
(52) U.S. Cl.
CPC ........ *F16D 43/18* (2013.01); *F16D 2043/145* (2013.01)
(58) Field of Classification Search
CPC .... F16D 2043/145; F16D 43/18; F16D 43/14; F16D 43/16; F16H 2007/081; F16H 55/563
See application file for complete search history.

(56) References Cited

U.S. PATENT DOCUMENTS 1,852,552 A * 4/1932 Altorfer .................. F16D 47/00
192/105 CD
2,429,153 A * 10/1947 Ammon .................. F16D 43/18
192/105 CD
(Continued)

FOREIGN PATENT DOCUMENTS

AT 349917 B 5/1979
CN 104696388 A 6/2015
(Continued)

OTHER PUBLICATIONS

Extended European Search Report (EESR) dated Feb. 14, 2020 for the corresponding European Patent Application No. 17858063.5.
(Continued)

*Primary Examiner* — Mark A Manley
(74) *Attorney, Agent, or Firm* — Rankin, Hill & Clark LLP (57) ABSTRACT

The present invention relates to a centrifugal clutch (100). The centrifugal clutch (100) includes a drive plate (110) that is rotationally driven directly by the driving force of the engine. The drive plate (110) includes a swing support pin (113) that supports a clutch shoe (123) in a swinging state with respect to a clutch outer part (130), and a spring support (115) that supports a torsion spring (116). The spring support (115) is provided in a standing state on a base (111) adjacent to one distal end (121*a*) of both end parts of a clutch weight (120) in the circumferential direction that faces a tubular surface (131) of the clutch outer part (130). Both end parts (116*b*) and (116*c*) of the torsion spring (116) are respectively hooked on the distal end (121*a*) of one clutch weight (120) and a proximal end (121*b*) of the other clutch weight (120) of the two clutch weights (120).

11 Claims, 7 Drawing Sheets

(56) References Cited

U.S. PATENT DOCUMENTS

| | | | |
|---|---|---|---|
| 3,779,355 A | 12/1973 | Okuno | |
| 5,341,907 A | 8/1994 | Yokocho | |
| 6,536,574 B2* | 3/2003 | Fehring | F16D 43/10 |
| | | | 192/105 C |
| 2005/0178637 A1* | 8/2005 | Tsuchiya | F16D 43/18 |
| | | | 192/105 CD |
| 2007/0095629 A1* | 5/2007 | Ishikawa | F16D 43/18 |
| | | | 192/105 CD |
| 2009/0298646 A1* | 12/2009 | Parsons | F16D 41/07 |
| | | | 477/167 |
| 2015/0354407 A1 | 12/2015 | Anglin | |

FOREIGN PATENT DOCUMENTS

| | | |
|---|---|---|
| CN | 205401513 U | 7/2016 |
| EP | 2930390 A1 | 10/2015 |
| JP | S47035537 A | 11/1972 |
| JP | S51053338 U | 4/1976 |
| JP | H04101034 U | 9/1992 |
| JP | H05083479 U | 11/1993 |
| JP | 2005344830 A | 12/2005 |
| JP | 2013007432 A | 1/2013 |
| JP | 2015203429 A | 11/2015 |

OTHER PUBLICATIONS

International Search Report dated Nov. 7, 2017 filed in PCT/JP2017/028742.
European Office Action (EPOA) dated Nov. 26, 2020 issued in the corresponding European Patent Application No. 17858063.5.

* cited by examiner

CENTRIFUGAL CLUTCH

TECHNICAL FIELD

The present invention relates to a centrifugal clutch that cuts off the transmission of the rotational driving force to the driven side until the engine reaches predetermined rotational speed and transmits the rotational driving force to the driven side when the engine reaches predetermined rotational speed.

BACKGROUND ART

A centrifugal clutch that transmits the rotational driving force to the driven side when the engine reaches predetermined rotational speed has typically been used in motorcycles and mowers. For example, the centrifugal clutch disclosed in Patent literature 1 has the configuration below. Three clutch weights are disposed to extend in the circumferential direction on the annular second drive plate in a plan view. The three clutch weights are elastically connected to each other by the connection spring, and swings with respect to the tubular surface inside the clutch outer part disposed outside the second drive plate. Thus, in the centrifugal clutch described in Patent literature 1, the centrifugal force by the rotational drive of the second drive plate brings the clutch weights into contact with the tubular surface of the clutch outer part via the clutch weight while the clutch weights resist the connection spring, and thus, the rotational driving force is transmitted.

CITATION LIST

Patent Literature

Patent literature 1: JP-A-2015-203429

However, in the centrifugal clutch described in Patent literature 1, the connection spring is connected to the substantially center part of the clutch weight extending in the circumferential direction of the second drive plate. Therefore, a connection spring having large elastic force (tensile force) is necessary to regulate the displacement of the clutch weight in the centrifugal direction. As a result, there has been an issue that it is difficult to secure the necessary clutch capacity (magnitude of the power transmitted by the clutch) and the size of the device configuration become enlarged.

The present invention has been made to address the above issue. The object of the present invention is to provide a centrifugal clutch that can easily secure the clutch capacity without enlarging the size of the device configuration.

In order to address the above issue, a feature of the present invention is having a drive plate that receives driving force of an engine and is rotationally driven integrally with a driven pulley; clutch outer part that includes a tubular surface provided concentric to the drive plate outside the drive plate; a plurality of clutch weights that includes a clutch shoe extending in a circumferential direction of the drive plate and facing the tubular surface of the clutch outer part, is rotatably attached on the drive plate via a swing support pin, and swings in a direction in which the clutch shoe comes into contact with or becomes separated from the tubular surface of the clutch outer in accordance with centrifugal force due to rotational drive of the drive plate; and a torsion spring that applies force resisting the centrifugal force with respect to the clutch weight. In the feature of the present invention, the torsion spring is disposed adjacent to a distal end serving as an end that is far from the swing support pin of two both end parts of the clutch weight in a circumferential direction facing the tubular surface of the clutch outer part, and applies the force resisting the centrifugal force by coming into contact with a side of the distal end.

SUMMARY OF THE INVENTION

According to the feature of the present invention having the above configuration, in the centrifugal clutch, the torsion spring is displaced to be adjacent to the distal end of the clutch weight that swings with respect to the clutch outer part. Further, one end part of the torsion spring applies force to the distal end serving as the free end of the clutch weight. Therefore, the displacement of the clutch weight in the centrifugal direction can be regulated with smaller force compared with typical technology. As a result, the centrifugal clutch according to the present invention can easily secure the clutch capacity without enlarging the size of the device configuration. In addition, in this case, the torsion spring is disposed at the outermost peripheral part of the drive plate. Thus, the centrifugal force due to the rotational drive of the drive plate decreases the force pressing the clutch weight to the inside in the radial direction. Therefore, the clutch weight can be easily pushed to the clutch outer part.

Another feature of the present invention is that the swing support pin may be provided at a position adjacent to the distal end of the clutch weight on an outer edge part of the drive plate, and the torsion spring may be supported by the swing support pin.

According to another feature of the present invention having the above configuration, in the centrifugal clutch, the swing support pin serving as a fulcrum of the swing of the clutch weight is provided at a position adjacent to the distal end of the clutch weight on the outer edge part of the drive plate to support the torsion spring. Therefore, components of the centrifugal clutch can be densified, and the size of the device configuration can be reduced.

Another feature of the present invention is that in the centrifugal clutch, the torsion spring is supported by being fitted to a pin-shaped spring support by the drive plate or the clutch weight in a state in which the coil part formed between both end parts is rewound.

According to another feature of the present invention having the above configuration, in the centrifugal force, the coil part formed between both end parts of the torsion spring is supported by being fitted to the pin-shaped spring support by the drive plate or the clutch weight in a rewound state. This increases the inner diameter of the coil part of the torsion spring when the clutch weight is displaced in the centrifugal direction, and the frictional resistance with the spring support is suppressed. Thus, it is possible to suppress excessive force from acting on the torsion spring by the displacement of the clutch weight. The state in which the coil part of the torsion spring is rewound refers to the state in which both end parts of the torsion spring are spread in the direction in which the winding of the coil part is removed.

Another feature of the present invention is that in the centrifugal clutch, the torsion spring may be provided on an opposite side of a side of the drive plate in the clutch weight.

According to another feature of the present invention having the above configuration, in the centrifugal clutch, the torsion spring is provided on an opposite side of the drive plate in the clutch weight. Therefore, compared with the case in which the torsion spring is disposed between the drive plate and the clutch weight, the assembly work of the torsion spring can be simplified, and the manufacturing load and the maintenance load can be reduced.

According to another feature of the present invention having the above configuration, in the centrifugal clutch, one of both end parts of the torsion spring may be hooked on the drive plate.

According to another feature of the present invention having the above configuration, in the centrifugal clutch, one end part of both end parts of the torsion spring is hooked on the drive plate. Thus, the friction between the clutch weight and the torsion spring can be suppressed compared with the state in which one end part is hooked on the clutch weight. Further, the size of the torsion spring can be reduced, and the size of the device configuration can be reduced.

DESCRIPTION OF THE EMBODIMENTS

Figure 1:
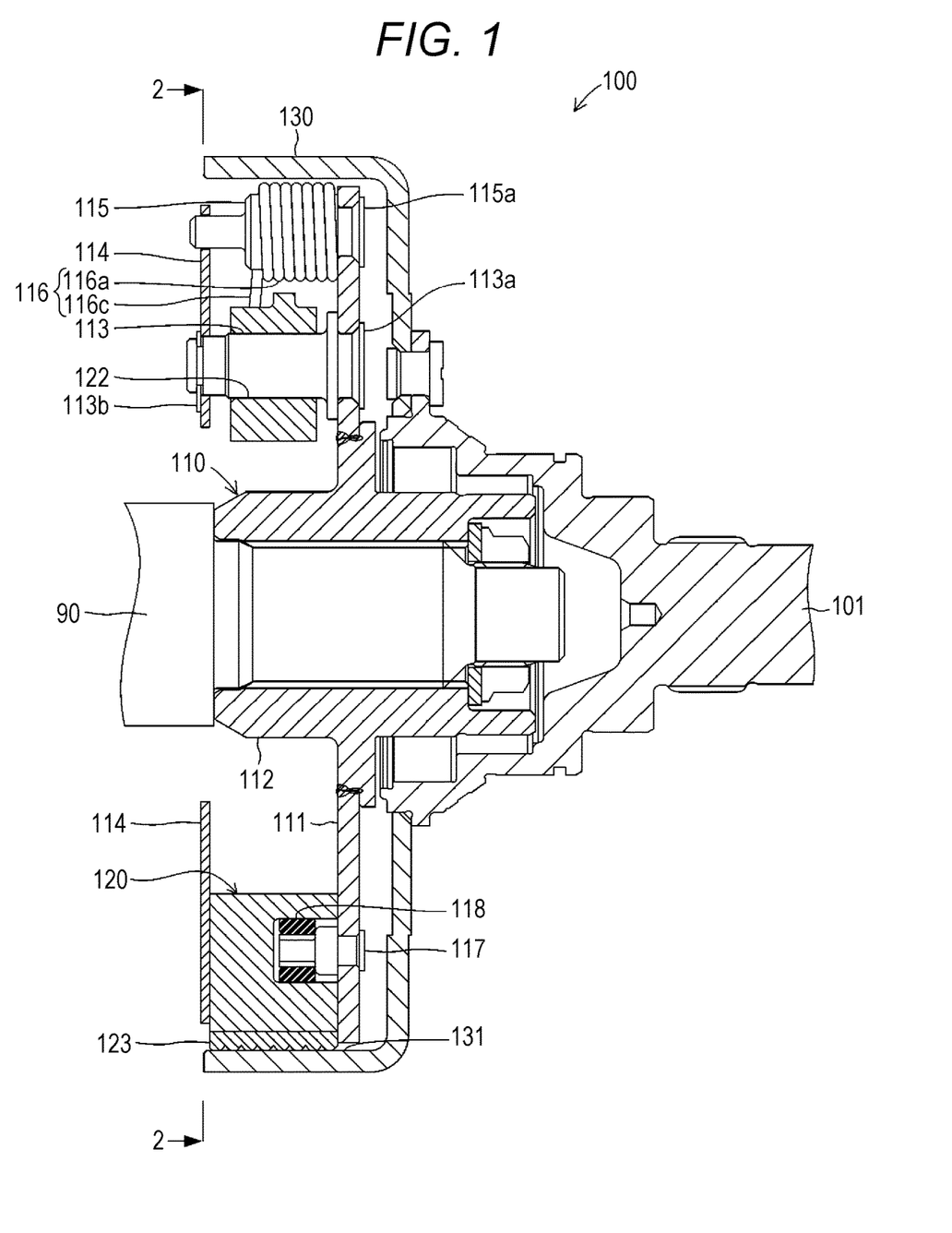
FIG. 1 is a side sectional view schematically showing a configuration of a centrifugal clutch according to the present invention.
Figure 2:
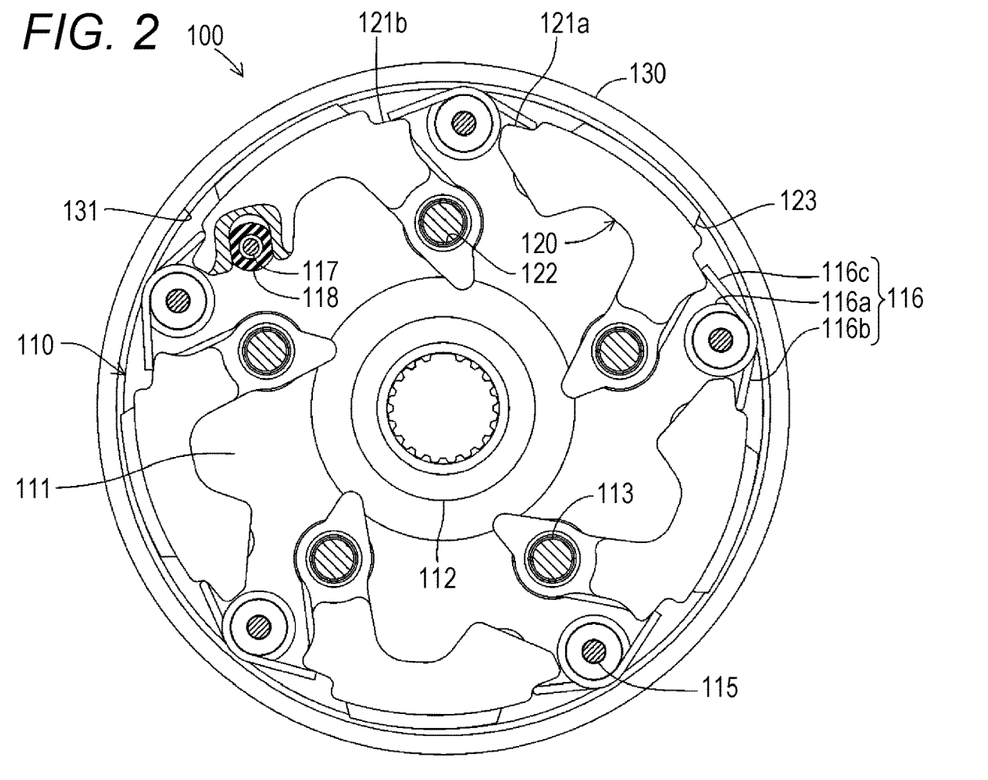
FIG. 2 is a partial breakaway plan view showing an internal configuration of the centrifugal clutch seen from the line 2-2 in FIG. 1.

An embodiment of the centrifugal clutch according to the present invention will be described below with reference to the drawings. FIG. 1 is a side sectional view schematically showing a configuration of a centrifugal clutch 100 according to the present invention. In addition, FIG. 2 is a partial breakaway plain view showing an internal configuration of the centrifugal clutch 100 seen from the line 2-2 in FIG. 1. This centrifugal clutch 100 is a mechanical device that is provided between the engine and the rear wheel serving as a driving wheel of motorcycles such as scooters mainly to transmit or cut off the rotational driving force of the engine with respect to the rear wheel.

(Configuration of Centrifugal Clutch 100)

The centrifugal clutch 100 is a mechanical device that transmits or cuts off the rotational driving force of the engine that is not shown with respect to a drive shaft 101. The centrifugal clutch 100 mainly includes a drive plate 110, five clutch weights 120, and a clutch outer part 130.

Figure 3:
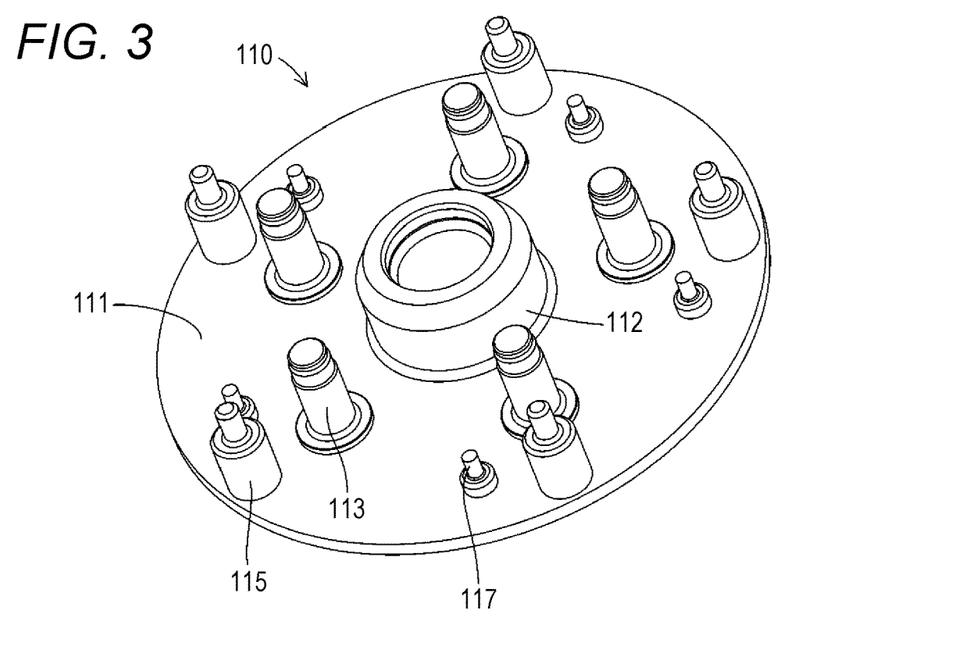
FIG. 3 is a perspective view schematically showing an appearance configuration of a drive plate of the centrifugal clutch shown in FIG. 1 and FIG. 2.

The drive plate 110 is a component that is provided on a crank shaft 90 extending from the engine and is rotationally driven directly by the rotational driving force of the engine. The drive plate 110 includes a metal material formed into a disk shape in a plan view. More specifically, in the drive plate 110, a fitting tubular part 112 where the crank shaft 90 is spline-fitted is formed at the center part of a planar base 111 as shown in FIG. 3. In addition, in the drive plate 110, the outside part of the fitting tubular part 112 on the base 111 is provided with five swing support pins 113, spring supports 115, and damper support pins 117 at equal intervals along the circumferential direction.

The swing support pin 113 is a component for rotatably supporting one end part side of the clutch weight 120 to be described later and swinging the other end part side. The swing support pin 113 includes a metal material formed into a pin shape. An attachment bolt 113a fixedly attaches the swing support pin 113 in a standing state on the inner side of the spring support 115 on the base 111. An E-ring 113b is also attached on the tip end part of the swing support pin 113 via a side plate 114. The side plate 114 is a component for pressing the five clutch weights 120. The side plate 114 includes a metal material formed into a ring shape.

The spring support 115 is a component for supporting a torsion spring 116. The spring support 115 includes a stepped rod body made of metal. In this case, in the spring support 115, the outer diameter that fits the inside of a coil part 116a of the torsion spring 116 is formed to be thinner than the inner diameter of the coil part 116a. The spring support 115 is fixedly attached by an attachment bolt 115a in a standing state at a position on the base 111 adjacent to one distal end 121a of both end parts of the clutch weight 120 in the circumferential direction that faces a tubular surface 131 of the clutch outer part 130 to be described later.

The torsion spring 116 is a component for applying force toward the inside of the drive plate 110 with respect to the clutch weight 120. The torsion spring 116 includes coiled spring steel. The torsion spring 116 is supported in the state in which the coil part 116a is fitted to the spring support 115 standing between the two clutch weights 120 at on the outer edge of the drive plate 110. In this case, in the torsion spring 116, both end parts 116b and 116c projecting from both end parts of the coil part 116a are respectively hooked on the distal end 121a of one clutch weight 120 and a proximal end 121b of the other clutch weight 120 of the two clutch weights 120 located on both sides of the torsion spring 116.

In this case, the torsion spring 116 is hooked on the clutch weights 120 in the state in which both end parts 116b and 116c are expanded in the direction in which the winding of the coil part 116a is removed. Thus, the torsion spring 116 is supported by being fitted to the spring support 115 in the state in which the coil part 116a is rewound.

The damper support pin 117 is a component for supporting a damper 118. The damper support pin 117 includes a metal rod body. The damper support pin 117 is fixedly provided near the spring support 115 on the base 111 of the drive plate 110 in a standing state. The damper 118 is a component that guides the swing motion of the other end part side of the clutch weight 120 that approaches or becomes separated with respect to the clutch outer part 130 and also serves as a buffer material at the time of separation.

The damper 118 includes a rubber material formed into a tubular shape. The damper 118 is fixedly fitted on the outer peripheral surface of the damper support pin 117.

Figure 4:
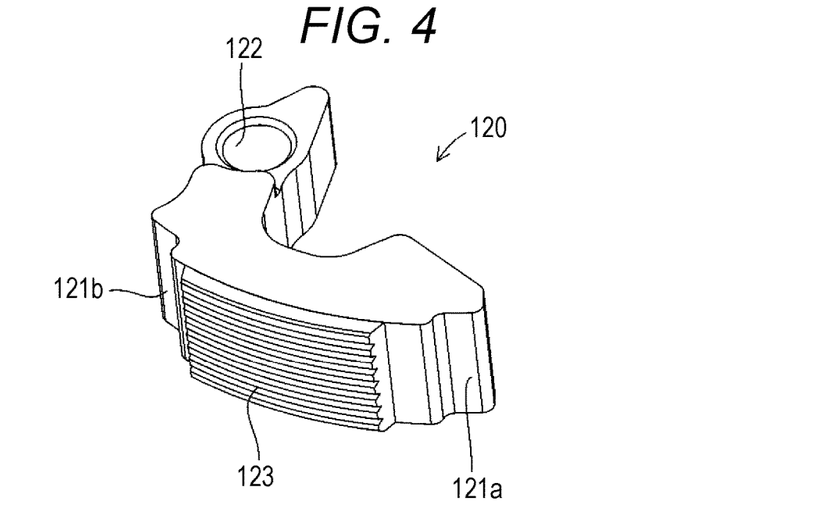
FIG. 4 is a perspective view schematically showing an appearance configuration of a clutch weight of the centrifugal clutch shown in FIG. 1 and FIG. 2.

As shown in FIG. 4, five clutch weights 120 are components for transmitting or cutting off the rotational driving force of the engine with respect to the drive shaft 101 by coming into contact with or become separated from the clutch outer part 130 via a clutch shoe 123 in accordance with the rotational speed of the drive plate 110. The clutch weight 120 includes a metal material (for example, a zinc material) formed in a curved shape that extends in the circumferential direction of the drive plate 110.

More specifically, the clutch weight 120 is formed in a block shape curved along the tubular surface 131 serving as the inner peripheral surface of the clutch outer part 130. The clutch weight 120 functions as a weight for generating centrifugal force when rotationally driven with the drive plate 110. One end part side of the clutch weight 120 in the circumferential direction of the drive plate 110 is bent in the inside direction of the drive plate 110 via the proximal end 121b, and a pin fitting hole 122 is formed there. The clutch weight 120 is rotatably supported by the swing support pin 113 via the pin fitting hole 122.

In this case, the proximal end 121b is an end part that is closer to the swing support pin 113 of both end parts of the clutch weight 120 in the circumferential direction that faces the tubular surface 131 of the clutch outer part 130. In other words, the proximal end 121b is a part between the end part of the clutch shoe 123 and the end part that of both end parts is closer to the swing support pin 113. The pin fitting hole 122 is a part where the swing support pin 113 is rotatably fitted in the drive plate 110. The pin fitting hole 122 includes a penetration hole that penetrates in the thickness direction of the clutch weight 120. In addition, the proximal end 121b of the clutch weight 120 is pushed toward the inside direction of the drive plate 110 by one end part 116c of the torsion spring 116.

On the other hand, the damper 118 is slidably fitted to the side of the distal end 121a that is on the opposite side of the proximal end 121b and is the end part that is farther from the swing support pin 113 in the clutch weight 120. Further, the side of the distal end 121a of the clutch weight 120 is pushed toward the inside direction of the drive plate 110 by one end part 116b of the torsion spring 116. In this case, the distal end 121a is an end part that it farther from the swing support pin 113 of both end parts of the clutch weight 120 in the circumferential direction that faces the tubular surface 131 of the clutch outer part 130. In other words, the distal end 121b is a part between the end part of the clutch shoe 123 and the end part that is farther from the swing support pin 113 of the both end parts. Further, in the clutch weight 120, the clutch shoe 123 is provided on the outer peripheral surface that faces the tubular surface 131 of the clutch outer part 130. The clutch shoe 123 is a component for increasing the friction force with respect to the inner peripheral surface of the clutch outer part 130. The clutch shoe 123 includes a friction material formed into a plate shape extending in an arc shape.

In FIG. 2, a part of one of the five clutch weights 120 is broken to clearly show the configuration of the clutch weight 120. In addition, the crank shaft 90, the E-ring 113b, and the side plate 114 are omitted in FIG. 2.

The clutch outer part 130 is a component that is rotationally driven integrally with the drive shaft 101. The clutch outer part 130 includes a metal material formed into a cup shape that covers the outer peripheral surface from the drive plate 110 to the clutch weights 120. That is, the clutch outer part 130 includes the tubular surface 131 that comes into friction contact with the clutch shoe 123 of the clutch weight 120 displaced on the outer peripheral side of the drive plate 110.

(Operation of Centrifugal Clutch 100)

Next, the operation of the centrifugal clutch 100 having the configuration above will be described. The centrifugal clutch 100 functions by forming a part of the power transmission mechanism (not shown) disposed between the engine and the rear wheel serving as a driving wheel of an automatic motorcycle (for example, a scooter). First, as shown in FIG. 2, the centrifugal clutch 100 cuts off the driving force between the engine and the drive shaft 101 when the engine is in an idling state. More specifically, in the centrifugal clutch 100, the rotational driving force of the engine transmitted via the crank shaft 90 rotationally drives the drive plate 110, rotationally driving the clutch weight 120.

However, in this case, in the centrifugal clutch 100, the centrifugal force acting on the clutch weight 120 is smaller than the elastic force (pressing force) of the torsion spring 116. Therefore, the clutch shoe 123 does not come into contact with the tubular surface 131 of the clutch outer part 130, and the rotational driving force of the engine is not transmitted to the drive shaft 101. In addition, in this case, the torsion spring 116 is disposed near the distal end 121a of the clutch weight 120 and presses the distal end 121a serving as the free end of the clutch weight 120. Therefore, the displacement of the clutch weight 120 in the centrifugal direction can be regulated with smaller force compared with typical technology.

Figure 5:
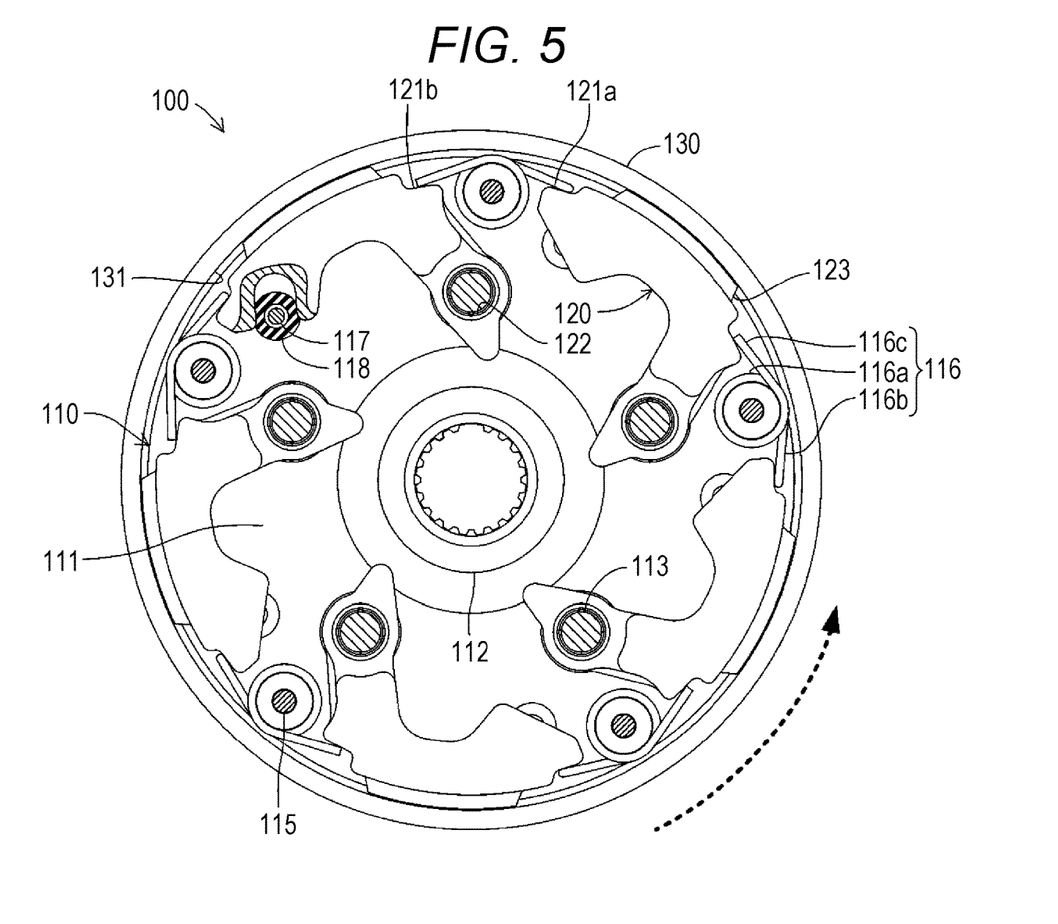
FIG. 5 is a partial breakaway view showing a connection state in which a clutch shoe of the centrifugal clutch shown in FIG. 2 is in contact with a clutch outer part.
Figure 6:
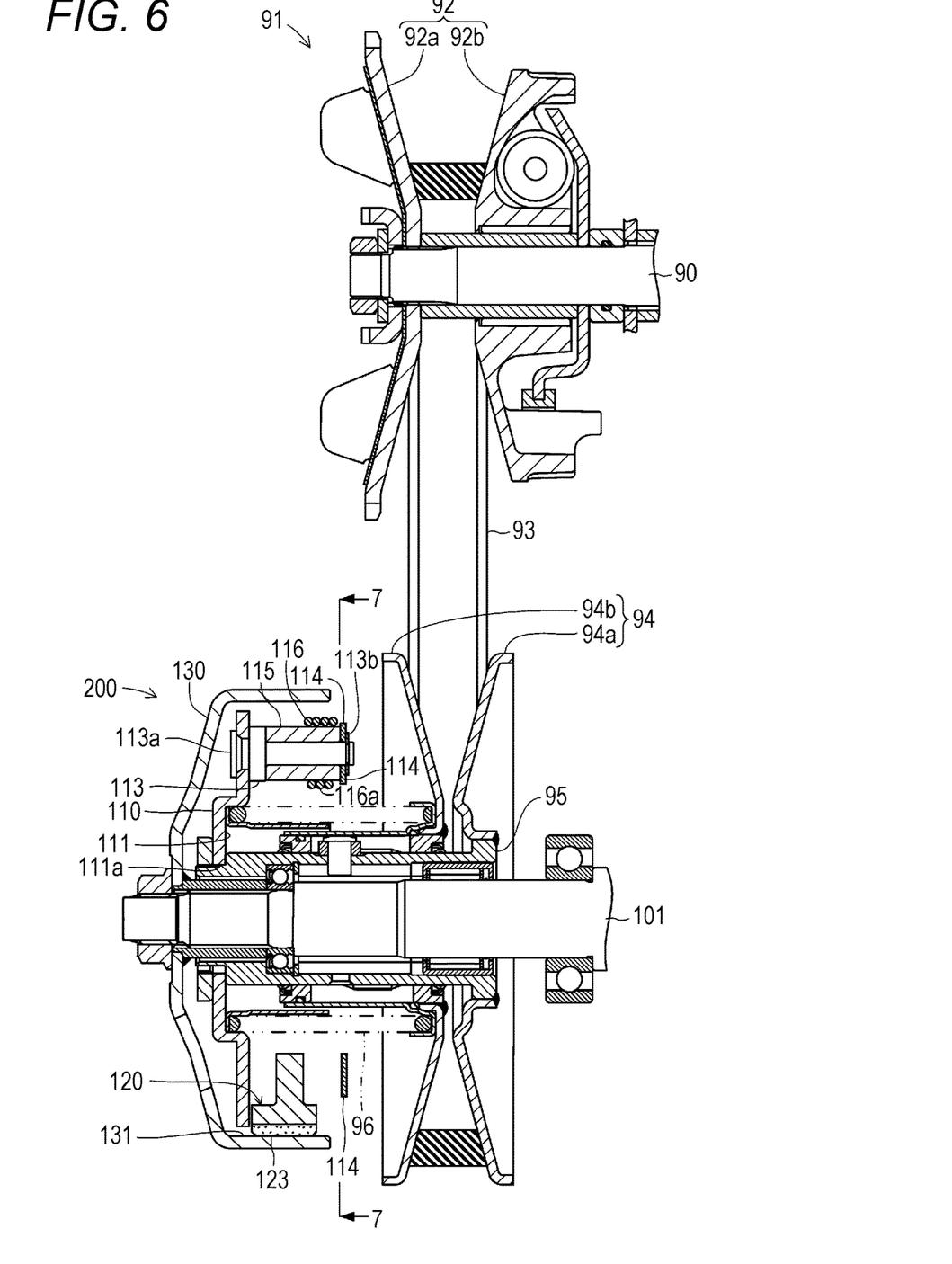
FIG. 6 is a side sectional view schematically showing a configuration of a power transmission device including the centrifugal clutch according to the present invention.

On the other hand, the centrifugal clutch 100 transmits the rotational driving force of the engine to the drive shaft 101 in accordance with the increase in the engine rotational speed by the accelerator operation by the driver of the automatic motorcycle. More specifically, in the centrifugal clutch 100, the centrifugal force acting on the clutch weight 120 becomes larger than the elastic force (pressing force) of the torsion spring 116 as the engine rotational speed increases as shown in FIG. 5. This rotationally displaces the clutch weight 120 toward the outside in the radial direction with the swing support pin 113 as a center.

That is, in the centrifugal clutch 100, the clutch weight 120 is rotationally displaced to the side of the tubular surface 131 of the clutch outer part 130 while resisting the elastic force (pressing force) of the torsion spring 116 in accordance with the increase in the engine rotational speed. As a result, the clutch shoe 123 comes into contact with the tubular surface 131. In this case, both end parts 116b and 116c of the torsion spring 116 open. Thus, the coil part 116a is rewound, and the fitting state of the coil part 116a and the spring support 115 become loose. Therefore, when the five clutch weights 120 are rotated, the coil part 116a easily rotates with respect to the spring support 115. In addition, the crank shaft 90, the E-ring 113b, and the side plate 114 are omitted in FIG. 5. In addition, the directions in which the drive plate 110 and the clutch outer part 130 of the centrifugal clutch 100 are rotationally driven are shown by the dashed line arrow in FIG. 5.

In the centrifugal clutch 100 in the connected state, to maintain the state in which the clutch shoe 123 is pushed to the tubular surface 131 of the clutch outer part 130, the drive plate 110 and the clutch outer part 130 are integrally rotated and driven, and the drive shaft 101 is rotationally driven. This enables the automatic motorcycle to drive by rotationally driving the rear wheel while shifting the transmission speed via the transmission (not shown) connected to the drive shaft 101.

On the other hand, the centrifugal clutch 100 cuts off the transmission of the rotational driving force of the engine to the drive shaft 101 when the engine rotational speed decreases. More specifically, in the centrifugal clutch 100, the centrifugal force acting on the clutch weight 120 becomes smaller than the elastic force (pressing force) of the torsion spring 116 as the engine rotational speed decreases. This rotationally displaces the clutch weight 120 toward the inside in the radial direction with the swing support pin 113 as a center.

Thus, the clutch weight 120 returns to the original position (position at the time of idling). That is, the centrifugal clutch 100 is in a disconnected state in which the clutch shoe 123 is not in contact with the clutch outer part 130 and the rotational driving force is not transmitted.

As explained in the above operation description, according to the above embodiment, in the centrifugal clutch 100, the torsion spring 116 is displaced to be adjacent to the distal end 121a of the clutch weight 120 that swings with respect to the clutch outer part 130. Further, one end part 116b of the torsion spring 116 applies force to the distal end 121a serving as the free end of the clutch weight 120. Therefore, the displacement of the clutch weight 120 in the centrifugal direction can be regulated with smaller force compared with typical technology. As a result, the centrifugal clutch 100 according to the present invention can easily secure the clutch capacity without enlarging the size of the device configuration. In addition, in this case, the torsion spring 116 is disposed at the outermost peripheral part of the drive plate 110. Thus, the centrifugal force due to the rotational drive of the drive plate 110 reduces the force pressing the clutch weight 120 to the inside in the radial direction. Thus, the clutch weight 120 can be easily pushed to the clutch outer part 130.

Furthermore, the practice of the present invention is not limited to the above embodiment, and various modifications can be made without departing from the object of the present invention. In the following modified examples, configurations that are similar to that of the above embodiment will be provided with the same reference numerals and the description thereof will be omitted.

For example, in the above embodiment, the torsion spring 116 is supported by the pin-shaped spring support 115 provided on the base 111 of the drive plate 110. In this case, the spring support 115 is provided in a standing state between the two clutch weights 120 that are adjacent to each other at the outer edge part of the base 111 of the drive plate 110. However, the torsion spring 116 just has to be disposed at a position that is adjacent to one distal end 121a of the clutch weight 120 that faces the tubular surface 131 of the clutch outer part 130. Therefore, the torsion spring 116 may be supported by the swing support pin 113 as shown in FIG. 6 to FIG. 9.

Specifically, the swing support pin 113 may be disposed at a position adjacent to the distal end 121a of the clutch weight 120 on the outer edge part of the drive plate 110. In this case, in the centrifugal clutch 200 shown in FIG. 6 to FIG. 9, three swing support pins 113 are provided to support three clutch weights 120. In addition, the clutch weight 120 is formed in a substantially arc shape extending to the swing support pin 113 while extending along the circumferential direction of the drive plate 110. Further, the spring support 115 and the pin fitting hole 122 are formed on the side of the proximal end 121b of the clutch weight 120.

In this case, the spring support 115 is a part that fits the coil part 116a of the torsion spring 116. The spring support 115 is formed in a tubular shape along the thickness direction of the clutch weight 120. The spring support 115 is formed on the side of the side plate 114 that is on the opposite side of the swing support pin 113. In addition, in the torsion spring 116, both end parts 116b and 116c are respectively hooked on the distal end 121a of one clutch weight 120 and the proximal end 121b of the other clutch weight 120 of the two clutch weights 120 located on both sides of the swing support pin 113 in the state in which the coil part 116a is fitted to the spring support 115.

Figure 7:
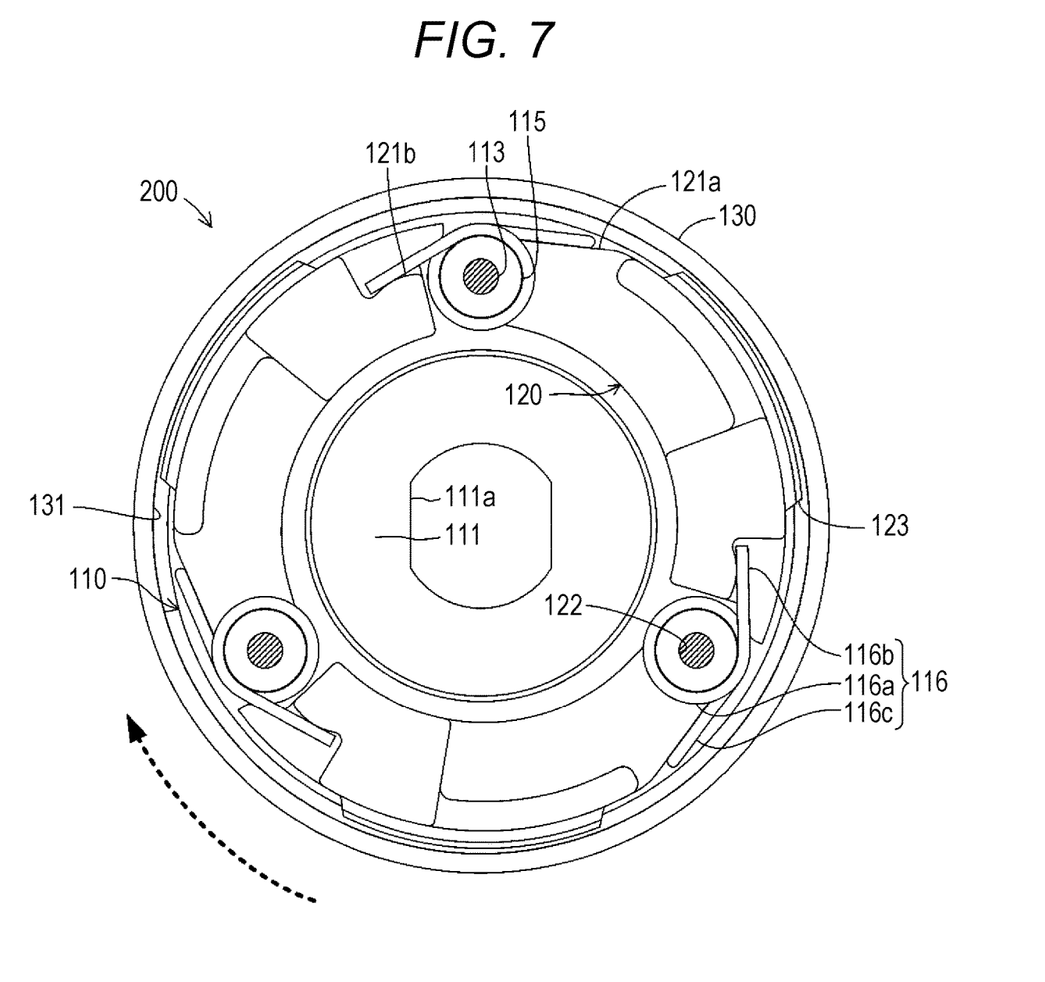
FIG. 7 is a partial breakaway view showing an internal configuration of the centrifugal clutch seen from the line 7-7 in FIG. 6.
Figure 8:
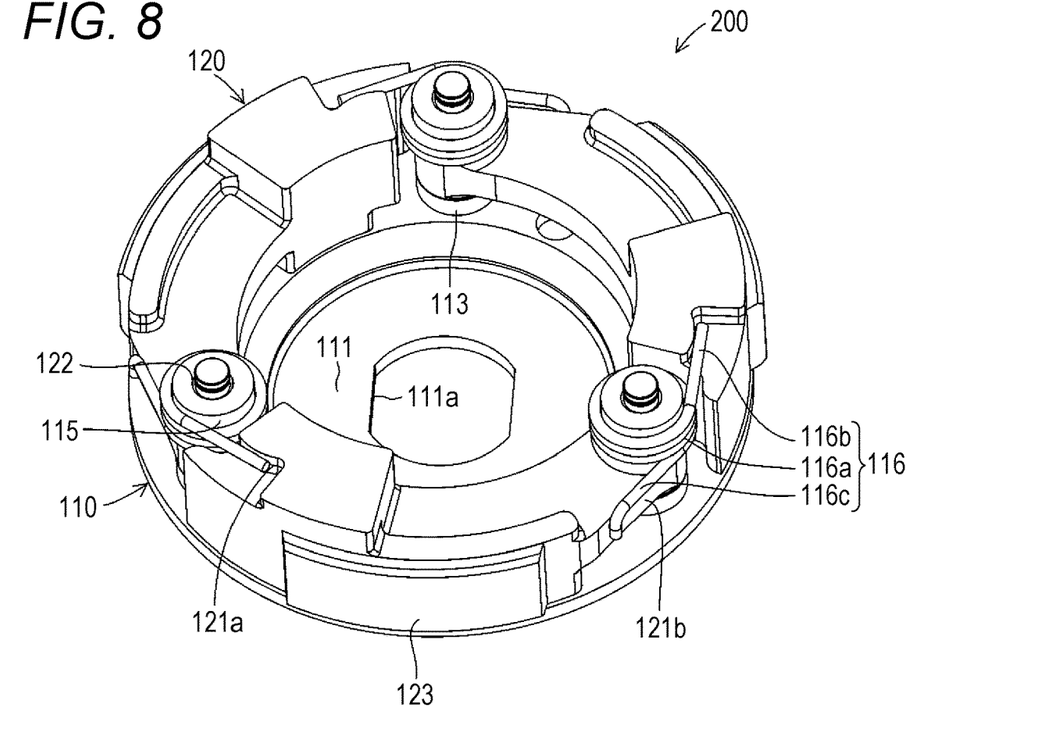
FIG. 8 is a perspective view schematically showing an appearance configuration of the centrifugal clutch shown in FIG. 6 and FIG. 7.
Figure 9:
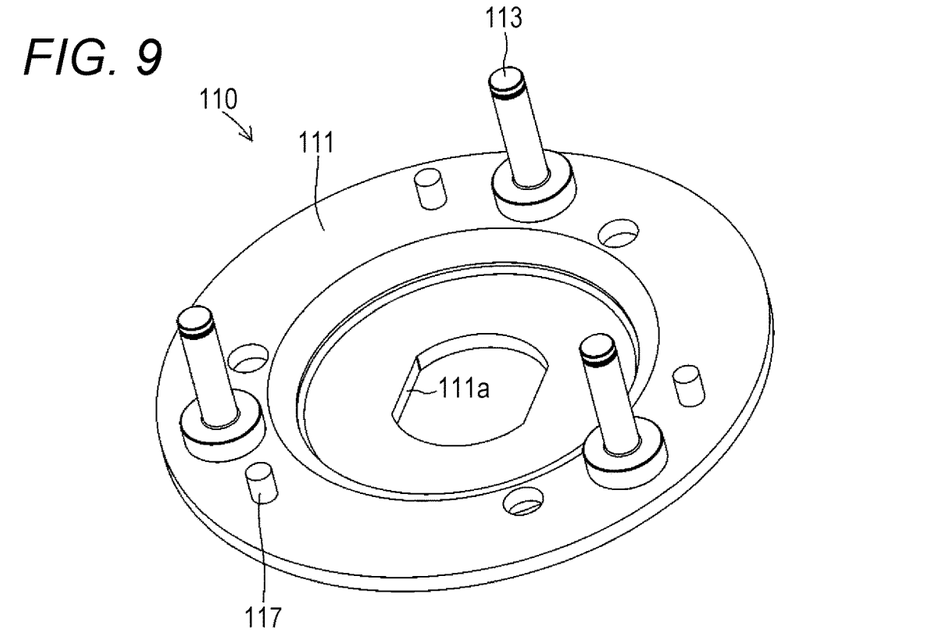
FIG. 9 is a perspective view schematically showing an appearance configuration of the drive plate of the centrifugal clutch shown in FIG. 6 and FIG. 7.

According to the centrifugal clutch 200 having the above configuration, the swing support pin 113 serving as a fulcrum of the swing of the clutch weight 120 is disposed at a position adjacent to the distal end 121a of the clutch weight 120 on the outer edge part of the drive plate 110 to support the torsion spring 116. Therefore, components of the centrifugal clutch 200 can be densified, and the size of the device configuration can be reduced. In addition, in the centrifugal clutch 200, the torsion spring 116 is provided on the opposite side of the drive plate 110 on the clutch weight 120. Therefore, compared with the case in which the torsion spring 116 is disposed between the drive plate 110 and the clutch weight 120, the assembly work of the torsion spring 116 can be simplified, and the manufacturing load and the maintenance load can be reduced. In FIG. 7, the drive shaft 101, the E-ring 113b, and the side plate 114 are omitted, and the directions in which the drive plate 110 and the clutch outer part 130 are rotationally driven are shown by the dashed line arrow. In addition, in FIG. 8, the E-ring 113b, the side plate 114, and the clutch outer part 130 are omitted.

Figure 10:
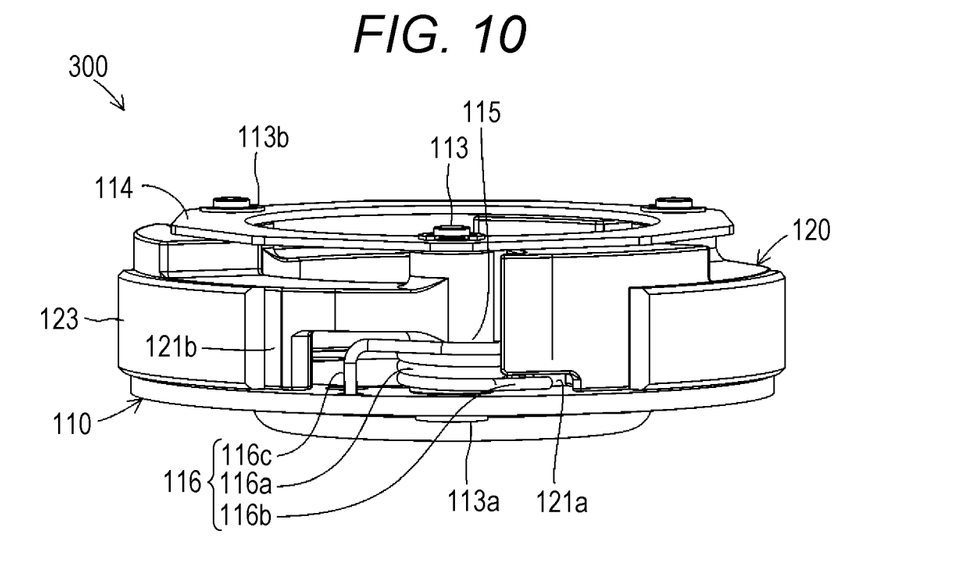
FIG. 10 is a perspective view schematically showing an appearance configuration of a centrifugal clutch according to another embodiment of the present invention.
Figure 11:
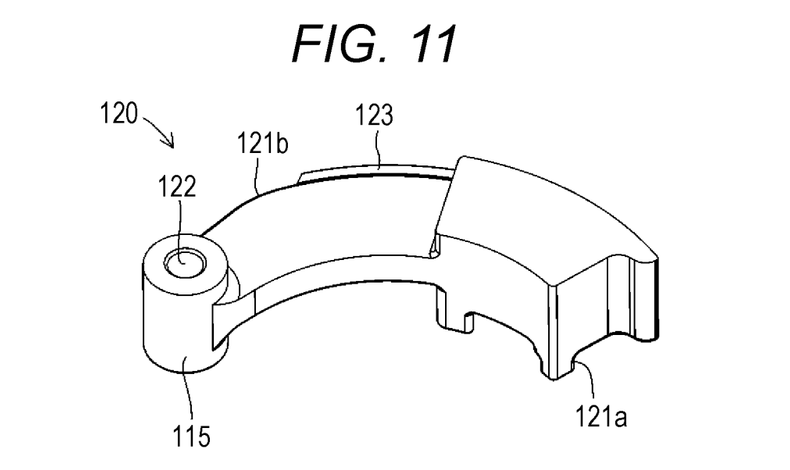
FIG. 11 is a perspective view schematically showing an appearance configuration of a clutch weight of the centrifugal clutch shown in FIG. 10.

On the other hand, in the centrifugal clutch 200, the torsion spring 116 may be disposed between the drive plate 110 and the clutch weight 120 as stated previously. Specifically, in a centrifugal clutch 300, the spring support 115 of the clutch weight 120 is formed on the side of the drive plate 110 as shown in FIG. 10. In addition, both end parts 116b and 116c of the torsion spring 116 may be installed between the 2 clutch weights 120 that face each other as stated previously. On the other hand, one end part 116b may be hooked on the distal end 121a of the clutch weight 120, and the one end part 116c may be hooked on the penetration hole formed on the base 111 of the drive plate 110. In FIG. 10, the clutch outer part 130 is omitted.

According to the centrifugal clutch 300 having the configuration above, the end part 116c of the torsion spring 116 is hooked on the drive plate 110. Thus, the friction between the end part 116c and the proximal end 121b of the clutch weight 120 due to the rotation of the clutch weight 120 can be suppressed. Further, the size of the torsion spring 116 can be reduced, and the size of the device configuration can be reduced.

In the centrifugal clutches 200 and 300 shown in FIG. 6 to FIG. 10, the rotational driving force from the engine is transmitted via a transmission 91. The transmission 91 mainly includes a drive pulley 92, a V-belt 93, and a driven pulley 94. Among these components, the drive pulley 92 is a component that is provided on the crank shaft 90 extending from the engine and is rotationally driven directly by the rotational driving force of the engine. The drive pulley 92 mainly includes a fixed drive plate 92a and a movable drive plate 92b.

In this case, the drive pulley 92 is formed in a manner that the movable drive plate 92b approaches or becomes separated with respect to the fixed drive plate 92a by the centrifugal force by rotational drive of the crank shaft 90. In addition, the V-belt 93 having the driven pulley 94 connected is hooked between the fixed drive plate 92a and the movable drive plate 92b. The V-belt 93 is a component for transmitting the rotational driving force of the drive pulley 92 to the driven pulley 94. The V-belt 93 is formed in an endless ring shape having core wire covered with a resin material.

The driven pulley 94 is a mechanical device that is rotationally driven by the rotational driving force of the engine transmitted via the drive pulley 92 and the V-belt 93. The driven pulley 94 mainly includes a fixed driven plate 94a and a movable driven plate 94b. The fixed driven plate 94a is integrally connected to the drive plate 110 of the centrifugal clutch 200, 300 via a driven sleeve 95 formed in a tubular shape. In this case, the driven sleeve 95 is attached to the drive shaft 101 connected to the rear wheel of the automatic motorcycle via a bearing in a relatively rotatable state. In addition, the driven sleeve 95 is fitted integrally with the drive plate 110 to penetration hole 111a formed at the center part of the base 111 of the drive plate 110 in a rotationally drivable state.

On the other hand, the movable driven plate 94b is fitted in the state in which sliding in the axial direction is possible on the driven sleeve 95 in the state in which the drive plate 110 is pressed via a torque spring 96. Thus, the driven pulley 94 is formed in a manner that the movable driven plate 94b approaches or becomes separated with respect to the fixed driven plate 94a by the tensile force of the V-belt 93.

That is, the continuously variable transmission 91 changes the rotational speed of the engine in a stepless manner in accordance with the magnitude correlation between the diameter sandwiching the V-belt 93 that is defined by the interval between the fixed drive plate 92a and the movable drive plate 92b and the diameter sandwiching the V-belt 93 that is defined by the interval between the fixed driven plate 94a and the movable driven plate 94b.

In addition, in the above embodiment, the centrifugal clutches 100, 200, and 300 are formed by a so-called leading method in which the side of the distal end 121a of the clutch weight 120 becomes the front direction of the rotational direction of the drive plate 110. However, the centrifugal clutches 100, 200, and 300 may be formed by a so-called trading method in which the side of the proximal end 121b of the clutch weight 120 becomes the front direction of the rotational direction of the drive plate 110.

In addition, in the above embodiment, in the centrifugal clutches 100, 200, and 300, the torsion spring 116a is used in the state in which the coil part 116 is rewound with respect to the clutch weight 120. In this case, looseness of the torsion spring 116 can be suppressed by forming the torsion spring 116 in a manner that the inner peripheral part of the coil part 116a comes into contact with the outer peripheral part of the spring support 115 in the state in which the clutch weight 120 is separated from the clutch outer part 130.

However, the torsion spring 116 may also be used in the state in which the torsion spring 116 is wound with respect to the clutch weight 120. That is, the torsion spring 116 may also be used in the state in which both end parts 116b and 116b of the torsion spring 116 are closed in the direction, in which the winding of the coil part 116a is tightened, and hooked on the clutch weight 120.

LIST OF REFERENCE NUMERALS

90 . . . crank shaft, 91 . . . transmission, 92 . . . drive pulley, 92a . . . fixed drive plate, 92b . . . movable drive plate, 93 . . . V-belt, 94 . . . driven pulley, 94a . . . fixed driven plate, 94b . . . movable driven plate, 95 . . . driven sleeve, 96 . . . torque spring, 100, 200, 300 . . . centrifugal clutch, 101 . . . drive shaft, 110 . . . drive plate, 111 . . . base, 111a . . . penetration hole, 112 . . . fitting tubular part, 113 . . . swing support pin, 113a . . . attachment bolt, 113b . . . E-ring, 114 . . . side plate, 115 . . . spring support, 116 . . . torsion spring, 116a . . . coil part, 116b, 116c . . . end part, 117 . . . damper support pin, 118 . . . damper,

120 . . . clutch weight, 121a . . . distal end, 121b . . . proximal end, 122 . . . pin fitting hole,

123 . . . clutch shoe, 130 . . . clutch outer part, 131 . . . tubular surface.

The invention claimed is:

1. A centrifugal clutch, comprising:
   a drive plate that receives driving force of an engine and is rotationally driven integrally with a driven pulley;
   a clutch outer part that includes a tubular surface provided concentric to the drive plate outside the drive plate; and
   a plurality of clutch weights comprising a first clutch weight rotatably attached on the drive plate via a first swing support pin, and a second clutch weight rotatably attached on the drive plate via a second swing support pin and being separate from the first clutch weight, wherein
   each of the first clutch weight and the second clutch weight includes a clutch shoe extending in a circumferential direction of the drive plate and facing the tubular surface of the clutch outer part, and swings in a direction in which the clutch shoe comes into contact with or becomes separated from the tubular surface of the clutch outer part in accordance with centrifugal force due to rotational drive of the drive plate,
   each of the first clutch weight and the second clutch weight comprises a distal end and a proximal end opposite to the distal end in the circumferential direction, the distal end and the proximal end facing the tubular surface of the clutch outer part, the distal end of the first clutch weight being farther from the first swing support pin than the proximal end of the first clutch weight is, the distal end of the second clutch weight being farther from the second swing support pin than the proximal end of the second clutch weight is,
   the centrifugal clutch further comprises a torsion spring comprising a first end part and a second end part opposite to the first end part, the first end part being in contact with the proximal end of the first clutch weight, the second end part being in contact with the distal end of the second clutch weight,
   the torsion spring applies force resisting the centrifugal force on the distal end of the second clutch weight while the engine is in an idling state,
   the torsion spring comprises a coil part which is rewound as the distal end of the second clutch weight swings toward the tubular surface, and
   the proximal end of the first clutch weight is pushed toward the inside direction of the drive plate by the first end part.

2. The centrifugal clutch according to claim 1, wherein the torsion spring is supported by being fitted to a pin-shaped spring support on the drive plate or the clutch weight in a state in which the first end part and the second end part are spread in a direction in which the coil part is rewound.

3. The centrifugal clutch according to claim 1, wherein one of the first end part and the second end part of the torsion spring is hooked on the drive plate.

4. The centrifugal clutch according to claim 1, wherein the distal end of the second clutch weight is pushed toward the inside direction of the drive plate by the second end part of the torsion spring.

5. The centrifugal clutch according to claim 1, further comprising:
a first damper that guides a swing motion of the distal end of the first clutch weight that approaches or becomes separated with respect to the clutch outer part and serves as a buffer material at a time of the distal end of the first clutch weight becoming separated with respect to the clutch outer part; and
a second damper that guides a swing motion of the distal end of the second clutch weight that approaches or becomes separated with respect to the clutch outer part and serves as a buffer material at a time of the distal end of the second clutch weight becoming separated with respect to the clutch outer part.

6. A centrifugal clutch, comprising:
a drive plate that receives driving force of an engine and is rotationally driven integrally with a driven pulley;
a clutch outer part that includes a tubular surface provided concentric to the drive plate outside the drive plate; and
a plurality of clutch weights comprising a first clutch weight rotatably attached on the drive plate via a first swing support pin and a second clutch weight rotatably attached on the drive plate via a second swing support pin and being separate from the first clutch weight, wherein
each of the first clutch weight and the second clutch weight includes a clutch shoe extending in a circumferential direction of the drive plate and facing the tubular surface of the clutch outer part, and swings in a direction in which the clutch shoe comes into contact with or becomes separated from the tubular surface of the clutch outer part in accordance with centrifugal force due to rotational drive of the drive plate,
each of the first clutch weight and the second clutch weight comprises a first end and a second end opposite to the first end in the circumferential direction, the first end and the second end facing the tubular surface of the clutch outer part, the first end of the first clutch weight being closer to the first swing support pin than the second end of the first clutch weight is, the first end of the second clutch weight being closer to the second swing support pin than the second end of the second clutch weight is,
the centrifugal clutch further comprises a torsion spring comprising a first end part and a second end part opposite to the first end part, the first end part being in contact with the second end of the first clutch weight, the second end part being in contact with the first end of the second clutch weight,
the torsion spring applies force resisting the centrifugal force on the first end of the second clutch weight while the engine is in an idling state,
the torsion spring is supported by the second swing support pin, the torsion spring comprises a coil part which is rewound as the second end of the first clutch weight swings toward the tubular surface,
the first end of the second clutch weight is pushed toward an inside direction of the drive plate by the second end part.

7. The centrifugal clutch according to claim 6, wherein the torsion spring is supported by the second swing support pin in a state in which the first end part and the second end part are spread in a direction in which the coil part is rewound.

8. The centrifugal clutch according to claim 6, wherein the torsion spring, each of the first clutch weight and the second clutch weight, and the drive plate are arranged in this order from an inside to an outside of the centrifugal clutch in an axial direction of a rotation of the drive plate.

9. The centrifugal clutch according to claim 6, wherein one of the first end part and the second end part of the torsion spring is hooked on the drive plate.

10. The centrifugal clutch according to claim 6, wherein the second end of the first clutch weight is pushed toward the inside direction of the drive plate by the first end part.

11. A centrifugal clutch, comprising:
a drive plate that receives driving force of an engine and is rotationally driven integrally with a driven pulley;
a clutch outer part that includes a tubular surface provided concentric to the drive plate outside the drive plate; and
a plurality of clutch weights comprising a first clutch weight rotatably attached on the drive plate via a first swing support pin, and a second clutch weight rotatably attached on the drive plate via a second swing support pin and being separate from the first clutch weight, wherein
each of the first clutch weight and the second clutch weight includes a clutch shoe extending in a circumferential direction of the drive plate and facing the tubular surface of the clutch outer part, and swings in a direction in which the clutch shoe comes into contact with or becomes separated from the tubular surface of the clutch outer part in accordance with centrifugal force due to rotational drive of the drive plate,
each of the first clutch weight and the second clutch weight comprises a distal end and a proximal end opposite to the distal end in the circumferential direction, the distal end and the proximal end facing the tubular surface of the clutch outer part, the distal end of the first clutch weight being farther from the first swing support pin than the proximal end of the first clutch weight is, the distal end of the second clutch weight being farther from the second swing support pin than the proximal end of the second clutch weight is,
the centrifugal clutch further comprises a torsion spring in contact with the distal end of the second clutch weight and applies force resisting the centrifugal force on the distal end of the second clutch weight while the engine is in an idling state,
the torsion spring comprises a first end part, a second end part opposite the first end part and a coil part formed between the first end part and the second end part, the coil part being rewound as the distal end of the second clutch weight swings toward the tubular surface,
the coil part is supported by being fitted to a pin-shaped spring support on the drive plate in a state in which the first end part and the second end part are spread in a direction in which the coil part is rewound, and
the coil part is circumferentially further from the second swing support pin than the distal end of the second clutch weight distance from the second swing support pin.

* * * * *